United States Patent

Fuller

[15] 3,701,117

[45] Oct. 24, 1972

[54] PHOTO-SELECT MEMORY SWITCH

[72] Inventor: Melvin L. Fuller, Los Angeles, Calif.

[73] Assignee: Litton Systems, Inc., Beverly Hills, Calif.

[22] Filed: Jan. 29, 1970

[21] Appl. No.: 6,744

[52] U.S. Cl. ..............................340/173 R, 307/238

[51] Int. Cl. ..............................................G11c 11/40

[58] Field of Search .......340/173 SP, 173 R, 173 LS; 307/238

[56] References Cited

UNITED STATES PATENTS

| | | | |
|---|---|---|---|
| 3,479,652 | 11/1969 | Foster | 340/173 LM |
| 3,201,764 | 8/1965 | Parker | 340/173 SP |
| 3,341,826 | 9/1969 | Lee | 340/173 LM |
| 3,191,040 | 6/1965 | Critchlow | 340/173 SP |
| 3,384,879 | 5/1968 | Stahl et al. | 340/173 SP |
| 3,488,636 | 1/1970 | Dyck | 340/173 SP |
| 3,465,293 | 9/1969 | Weckler | 340/173 LS |
| 3,407,393 | 10/1968 | Haas et al. | 340/173 LT |
| 3,486,031 | 12/1969 | Lynch | 340/173 LS |
| 3,617,823 | 11/1971 | Hofstein | 340/173 LS |

OTHER PUBLICATIONS

IBM Technical Disclosure Bulletin " Light Controlled Read–Only Storage" by Guydosh et al., Vol. 9, No. 1; 6/66; pgs. 87, 88, 340– 173SP.

*Primary Examiner*—Stanley M. Urynowicz, Jr.
*Attorney*—Alan C. Rose, Alfred B. Levine and Robert M. Angus

[57] ABSTRACT

The disclosed microcircuit and integrated circuit arrays are adapted to be functionally configured in response to radiant energy applied thereto during a configuring period. Elements and circuits of the arrays are selectively interconnected by photo select switching devices which operate as either an open or closed switch depending on whether the particular photo select switching device was illuminated by a light beam, for example, during the configuring (setting) period. Each photo select switching device comprises a solid state memory device operatively coupled to a photo diode such that the non-volatilely stored conductive characteristics of the memory device are determined by the conductive state of the photo diode during the setting period. The memory device in turn controls a solid-state switching transistor which is coupled in a connecting path of the array, thereby providing a desired switching function determined by the pattern of the illuminating energy during the setting period.

5 Claims, 20 Drawing Figures

Fig. 1
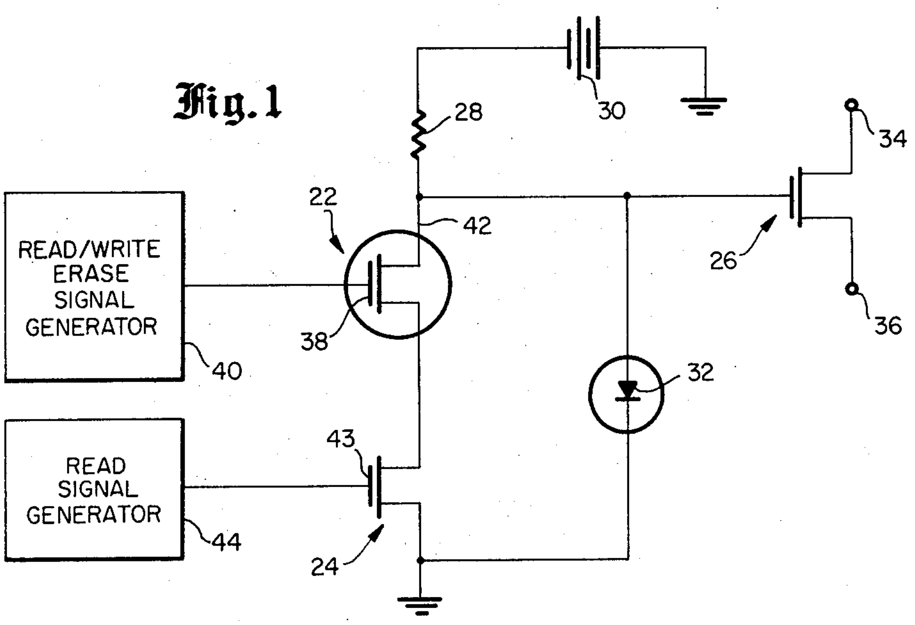
Fig. 8a
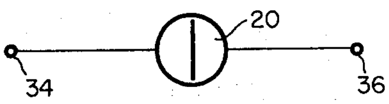
Fig. 8b
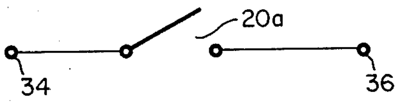
Fig. 8c
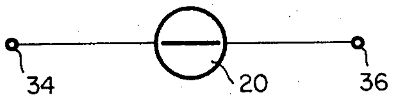
Fig. 8d
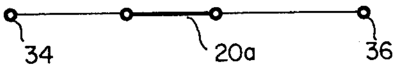
Fig. 9a
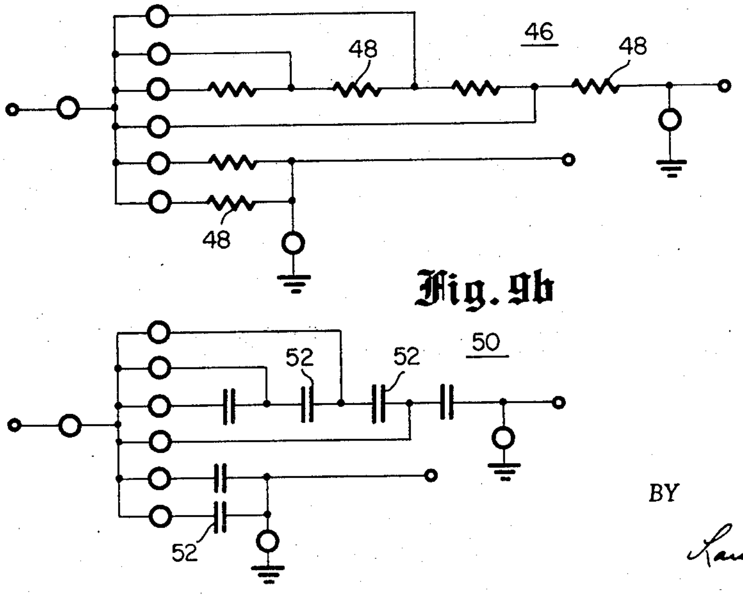
Fig. 9a, Fig. 9b
INVENTOR.
MELVIN L. FULLER
BY
Laurence V. Link Jr
ATTORNEY

INVENTORS

MELVIN L. FULLER

BY

Lawrence V. Link Jr

ATTORNEY

INVENTOR.
MELVIN L. FULLER
BY
Laurence V. Link Jr
ATTORNEY

INVENTOR.
MELVIN L. FULLER
BY
Lawrence V. Link Jr.
ATTORNEY

INVENTOR.
MELVIN L. FULLER
BY
Lawrence V. Link Jr.
ATTORNEY

PHOTO-SELECT MEMORY SWITCH

CROSS-REFERENCES TO RELATED APPLICATION

The present application is related to the U. S. Patent Application, entitled, "Bistable Electrical Circuit with Non-Volatile Storage Capabilities", by Andrew C. Tickle, Ser. No. 856,607, filed on Sept. 9, 1969, now U.S. Pat. No. 3660827 and assigned to the assignee of the present application.

BACKGROUND OF THE INVENTION

This invention relates generally to microcircuit arrays and particularly to such arrays which include light actuated switches in the connecting paths between selected circuits and elements of the array, whereby the circuits and combinations thereof may be configured or reconfigured in response to an actuating light beam.

Heretofore any interconnect function in microcircuit or integrated circuit arrays had to be "hard-wired". The additional space required for this wiring and for the access room necessary to apply the wiring, has proven detrimental to the over-all circuit density and costs of the resulting circuit array. Also, hard-wiring of switching functions reduces the yield of microcircuits due to damage to surrounding circuit areas induced during the wiring step. Additionally, a reliable switching device adaptable to integrated circuits would increase the yield of such circuits by allowing faulty units in an array to be replaced by operative spare units of a similar type. Further, an improved switching device adaptable to large scale integrated circuit arrays would result in economies in both the manufacture and inventory of integrated circuits by allowing a basic circuit type to be configured after manufacture, such as by switching input or output circuit elements, to serve multiple functions; hence allowing larger production runs of fewer basic circuit types.

SUMMARY OF THE INVENTION

Therefore, it is an object of the subject invention to provide microcircuits and integrated circuit arrays which may be functionally configured and reconfigured without mechanical disturbances of the circuitry.

Another object is to provide an integrated circuit array which includes light-actuated switching devices that allow the practical, economical replacement of defective circuits in the array with redundant spare circuits of a similar type during both the original manufacturing process and during repair of integrated circuits after use.

Still another object of the subject invention is to provide microcircuits having input and output circuits and networks which can be modified by light activated switching devices.

Yet another object is to provide an integrated circuit array in which the logic function of the array may be changed by illuminating the array through a mask having a desired transparency pattern alignable with photoselect switching devices on the array so as to configure the array according to the system logic function associated with the mask.

Another object of the invention is to provide an integrated circuit array which may be configured by light energy to a first configuration amenable to testing the array elements, and then reconfigured to a desired one of a plurality of possible operational configurations by disconnecting faulty circuits or elements and connecting operational circuits into a particular desired system configuration.

In accordance with one preferred embodiment of the subject invention, solid state microcircuits and elements thereof are interconnected with photo select switching devices such that the resulting array may be configured and reconfigured by switching devices — which devices are controlled or "set" by a beam of radiant energy. Each photo select switch device includes a semi-conductor memory device operatively coupled to a photo diode such that the conductive characteristics of the semi-conductor memory device are non-volatilely (memory properties not destroyed by prime power interruptions) stored in accordance with the illumination of the associated photo diode during a "setting" time period. The semiconductor memory device in turn controls a solid-state switching stage which provides the desired connections between selected circuits or elements during operation of the microcircuit or integrated array.

The non-volatile storage capabilities of the above-mentioned semi-conductor memory device result from a recently discovered characteristic of certain insulated-gate field-effects transistors. For example, when a layer of silicon nitride is used as the dielectric between the gate electrode and the substrate of an insulated gate field-effects transistor, the threshold voltage, $V_t$, of the resulting device may be shifted many volts by the application of a sufficiently large electric field of a first polarity across the silicon-nitride dielectric layer. This shift in threshold voltage has been found to be quasi-permanent and recovery under zero-applied field occurs with a time constant in the order of months or years. The application of a sufficiently large electric field of a second plurality (erase mode) restores the threshold voltage to its initial value in time periods of a few nanoseconds.

In the photo-select switches in accordance with the principles of the subject invention, the just-described shift in threshold voltage, $V_t$, of the metal nitride silicon transistors is utilized by coupling a photo diode to the metal nitride silicon devices so that upon application of a write voltage (during the write or setting mode of operation) applied to the gate terminal of the field-effect transistor, the threshold level is either set to a first or a second value according to the conductive state of the photo diode at that time. The conductive state of the photo diode is controllable by illumination of a light beam. During the operate mode of the circuit, a read or operate voltage is applied to the metal nitride silicon transistor and depending on the "memorized threshold" previously set, the metal nitride silicon transistor will conduct heavily or else will essentially remain non-conductive. The metal nitride silicon transistor is also coupled to a solid-state switching stage which controls the connection between circuits or elements of the integrated circuit array.

BRIEF DESCRIPTION OF THE DRAWINGS

The novel features which are characteristic of the invention, both as to its organization and method of construction and operation, together with further objects and advantages thereof, will be better understood from the following description taken in conjunction with the accompanying drawings in which the illustrative embodiments of the invention are disclosed.

In the drawings:

FIG. 1 is a schematic and block diagram of a photo select switch suitable for incorporation into circuits in accordance with the subject invention.

FIGS. 8*a*, 8*b* and 8*c*, 8*d* show the symbology adopted and the mechanical analog thereof, for a photo-select switch device in the open and closed positions.

FIGS. 9*a* and 9*b* show resistive and capacitive networks, respectively, which may be configured by means of the photo-select switching devices of FIG. 1 in response to a beam of radiant energy.

DESCRIPTION OF THE PREFERRED EMBODIMENTS

Figure 2:
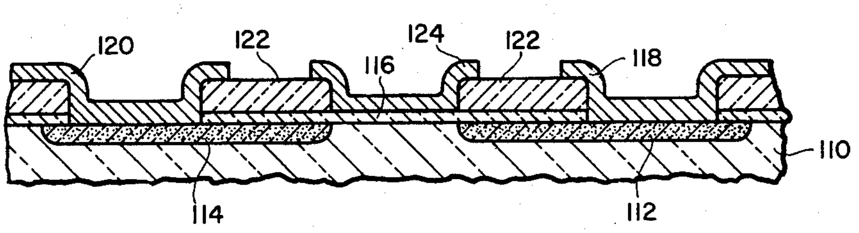
FIG. 2 is a cross-sectional view of a metal-nitride-silicon-insulated-gate field-effect transistor that may be utilized in the photo-select switch of FIG. 1.

The solid-state microcircuits of the present invention which may be configured in response to light energy applied to the microcircuit photo-switches, may be more readily understood after a brief explanation of one preferred embodiment of a photo-select switching device adaptable for incorporation into the circuits of the present invention.

Referring first primarily to FIG. 1, the photo-select switching circuit 20 includes signal translating devices 22, 24 and 26 which devices may be insulated-gate field-effect transistors. In the embodiment shown in FIG. 1, the signal translating devices are P channel on a N substrate types. However, it will be understood that the particular type of signal translating devices comprising the photo-select switching circuit are not critical to the subject invention and any suitable device which exhibits the characteristics described hereinafter may be utilized.

The drain terminal of the transistor 24 is connected to the source terminal of the transistor 22; and the drain terminal of the transistor 22 is coupled through a resistor 28 to a potential source 30 (depicted in FIG. 1 as a battery). The anode terminal of a silicon-photo diode 32 is connected to the drain terminal 42 of the transistor 22, and the cathode terminal of the diode is connected to the source terminal of the transistor 24 and to ground (reference potential plane).

The drain terminal of the transistor 22 is also connected to the gate terminal of transistor 26 and the drain terminal 34 and the source terminal 36 of the last-mentioned transistor are adapted to be series connected in the conductive paths of the microcircuit arrays in accordance with the present invention as will be described hereinafter.

While transistors 24 and 26 may be conventional metal-oxide-silicon devices, non-volatile (memory retention during the absence of prime power) operation of the photo-select switching circuit 20 is provided by transistor 22 which may be a metal-nitride-silicon-insulated gate field-effect transistor; and the operation of the circuit 20 may be better comprehended after first examining some characteristics of the last-mentioned transistor type.

The construction of a typical metal-nitride-silicon insulated-gate field-effect transistor is shown in the cross-sectional view of FIG. 2. The basic structure of the device of FIG. 2 comprises P+ type regions or channels 112 and 114 formed into an N type silicon substrate 110. A silicon-nitride film 116 is formed over the surface of the substrate 110, leaving openings for a metallic drain electrode 118 to contact the P+ type region 112 and for a source electrode 120 to contact the P+ type region 114. The silicon-nitride film 116 is covered with a silicon-dioxide sheeting 122 leaving openings for the electrodes 118 and 120 and for a gate electrode 124 which contacts the silicon-nitride film 116. In one such device suitable for utilization in the circuits of the subject invention, and adapted for a large scale integration, the silicon-nitride film 116 may be in the order of 700 to 1,400 angstroms thick, and the gap between the source and drain regions 114 and 112 respectively, may be on the order of 10 microns.

The following method has been successfully utilized in producing metal-nitride-silicon transistors suitable for the subject invention. However, it is understood that the invention is not limited to the devices produced by this method, but encompasses all similar suitable devices, regardless of how manufactured, within the scope and spirit of the claims.

The substrate 110 may be phosphorous doped silicon which is prepared by lapping, etching, polishing, etching, and is alkali cleaned followed by a deionized water wash. The P+ regions or channels 112 and 114 are formed by conventional boron diffusion (diborine) using a thermally grown oxide as a mask. Next the oxide diffusion mask is dissolved in buffered hydrofluoric acid and the silicon surface is then water washed, soap scrubbed, water washed, alkaline cleaned, washed in deionized water and dried in nitrogen.

The cleaned wafers are next placed on a quartz surface (carbon block) in an RF induction furnace and subjected to an RF discharge cleaning for approximately 7 minutes at about 200° C. Silicon nitride film 116 is deposited by the ammoniation of silane at 900° C. with the following flow rates: $SiH_4$ at 8 $cm^3$/min, $NH_3$ at 850 $cm^3$/min, and deposition of $Si_3N_4$ occurs at approximately 100 to 2,000 Angstroms/min.

The silicon dioxide sheeting 122 is also performed in an RF furnace by oxidation of silane. For the deposit of the silicon dioxide the flow rates are: $O_2$ at 80 $cm^3$/min, $SiH_4$ at 8.0 $cm^3$/min, $N_2$ at 10 liter/min. Initial temperature during this step is 700° C. and nucleation begins almost immediately when the $SiH_4$ is started. The wafer temperature is then lowered to 400° C. and approximately 7,000 Angstroms of $SiO_2$ is deposited at 500 Angstroms/min.

Next, the top layer of $SiO_2$ is etched by standard procedures to form a mask for the etching of the underlying $Si_3N_4$. The $Si_3N_4$ is etched in a concentrated reagent grade phosphoric acid at 180 degrees centigrade. Then the $SiO_2$ mask is dissolved and the metal electrodes 118, 120 and 124 attached by standard procedures.

It is noted that if the just described devices have been handled under atmospheric conditions, a minute layer of silicon-oxide may be formed between the substrate 110 and the silicon-nitride film 116. This oxide layer may be removed by heating the substrate 110 in a vacuum or reduced atmosphere and it has been noted that this minute layer of silicon-oxide may enhance the desired controllably threshold voltage shift of the MNS devices.

As explained previously the threshold voltage, $V_t$, of a field-effect transistor is the potential difference which must be applied between the gate and the source electrodes to cause the onset of substantial current conduction between the drain and the source electrodes. While the threshold voltage of a metal-oxide-silicon semiconductor transistor is substantially constant, it has been recently discovered that when silicon-nitride is used as the dielectric between the gate electrode and the substrate instead of silicon dioxide, the threshold voltage may be shifted by many volts by the application of a sufficiently large electric field across the dielectric film. This shift in the threshold voltage, $V_t$, which occurs in metal-nitride-silicon transistors, is semi-permanent in the absence of a second applied electric field, and recovery occurs with a time constant on the order of months or years. The application of an electric field of sufficient magnitude and of a second predetermined polarity across the dielectric layer of the metal-nitride-silicon devices acts to restore the threshold voltage to its initial value in a time of a few hundred nanoseconds.

Figure 3:
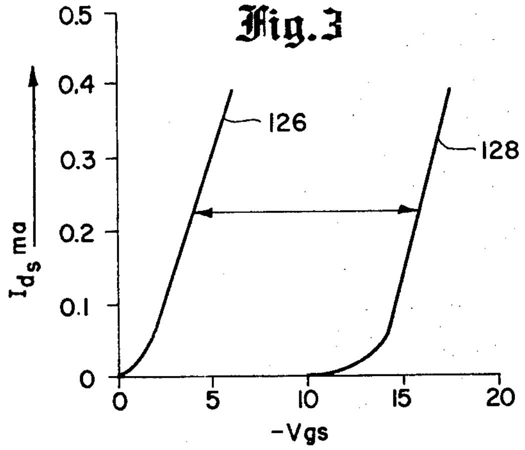
FIG. 3 is a graph of drain current versus the voltage between the gate and source elements of a metal-nitride-silicon transistor for explaining the non-volatile data storage capabilities of the transistor.

FIG. 3 shows the transfer characteristics of a metal-nitride-silicon semiconductor-insulator transistor after electric fields of first and second magnitudes and polarities have been applied across the silicon-nitride dielectric film 116 (FIG. 2). The ordinate in the graph of FIG. 3 ($I_{ds}$) is the current flowing between the source and drain terminals, and the abscissa ($V_{gs}$) is the voltage applied between the gate and source terminals of the metal-nitride-silicon device. Curves 126 and 128 could represent, for example, the transfer characteristics of one particular device after potential of a +40 voltage and a −30 voltage, respectively, have been applied across the dielectric film 116. After the application of the positive potential, the threshold voltage, $V_t$, is a least negative voltage and after the application of the negative potential the threshold, $V_t$, is shifted to a more negative value. For the particular metal-nitride-silicon device associated with the transfer characteristics of FIG. 3, and for the potentials stated above, the transfer characteristics are shifted approximately 12 volts in the negative direction upon the application of a large negative potential across the dielectric film.

Figure 4:
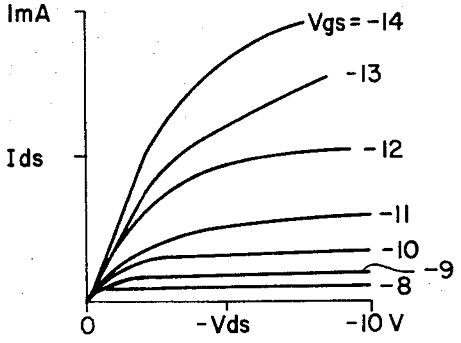
FIGS. 4 and 5 are graphs of drain current versus the voltage between the drain and source elements of a metal-nitride-silicon transistor for further explaining the storage capabilities of the transistor.
Figure 5:
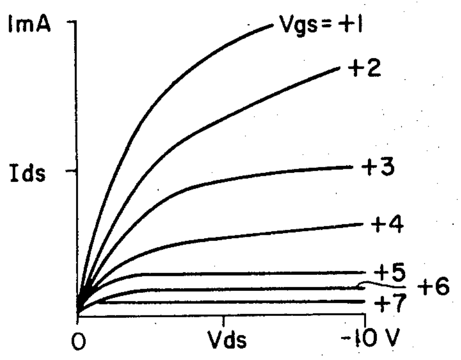

FIGS. 4 and 5 are graphs of the current flow between the drain and source electrodes plotted against the voltage between the drain and source electrodes ($V_{ds}$) for different values of potential applied between the gate and source electrodes ($V_{ds}$). In FIG. 4 a negative potential, for example a negative 30 volts, has been initially applied across the dielectric film resulting in a threshold voltage, $V_t$, of a negative 8 volts. In FIG. 5 a positive potential of 40 volts, for example, had initially been applied across the dielectric film resulting in a threshold voltage, $V_t$, of +4 volts. The shape of the characteristic curves as shown in FIG. 4 and 5 are independent of the value of the threshold voltage, $V_t$, and thus the effect of applying the strong positive and negative fields across the dielectric layer 111 is characterized completely by specifying the value of the threshold voltage, $V_t$.

Figure 6:
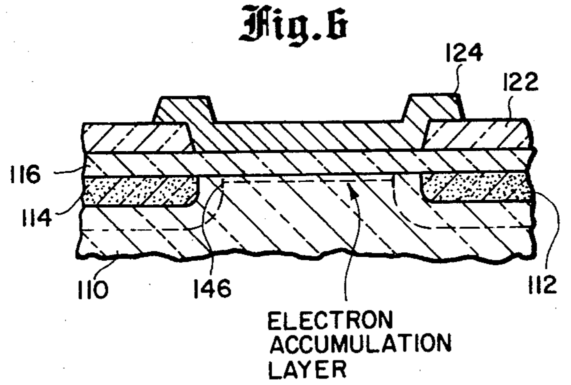
FIGS. 6 and 7 are cross-sectional views of a metal-nitride-silicon transistor for further explaining the various modes of operation of the transistor.

To establish the photo-select switching device 20 of FIG. 1 to either the "on" or the "off" state the circuit is first set to a clear configuration (erase mode of operation) by applying a large positive potential, for example, a positive 40 volts to the gate terminal 38 of the transistor 22 from a controllable source of potential, such as read/write/erase generator 40. The effect of applying the erase voltage to the gate terminal 38 is illustrated in the cross-sectional view of FIG. 6 wherein an electron accumulation layer 146 is shown formed at the interface surface between the substrate 110 and the dielectric or insulation film 116. The applied erase field causes the threshold value $V_t$ to shift to a less negative value.

Figure 7:
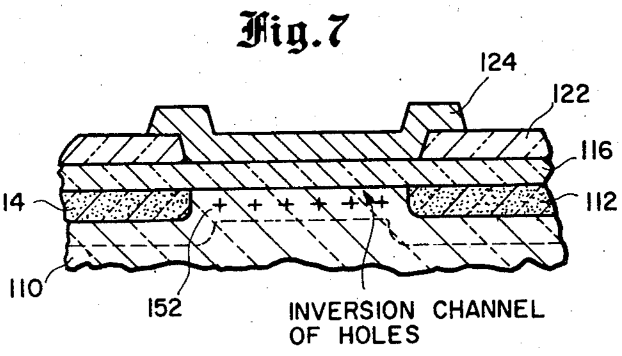

During the next step in setting the photo-select switch 20, a negative potential (write voltage) is applied to the gate terminal 38 from the read/write/write generator 40. In response to this negative potential, applied to the gate electrode 38 of the transistor 22, an inversion channel of holes, such as channel 152 of FIG. 7, is formed between the source element 114 and the drain element 112 of the transistor. It is important to note that due to the inversion channel of holes 152 that the potential of the substrate at the interface between the substrate 110 and the dielectric layer 116 is a function of the potential applied to the drain electrodes of the metal-nitride-silicon device 22. Therefore, if the photo-diode 32 is non-conducting, the drain electrode of the transistor 22 is substantially at the potential of the DC (direct current) source 30, which may be, for example, a negative 20 volts. Further, if the potential of the write pulses were a negative 30 volts, for example, there would only be a negative 10 volts appearing across the dielectric layer of the transistor 22, because the drain terminal 42 of the transistor was at a negative 20 volts and the inversion layer directly beneath the dielectric film 116 couples the dielectric-substrate interface to the same electrical potential as the drain terminal.

However, if the photo diode 32 is conducting heavily, then the drain terminal 42 of the transistor 22 is substantially at ground (reference plane) potential and there will be approximately a negative 30 volts applied across the dielectric film 116 of the transistor 24. As explained previously, it is a characteristic of insulated-gate field-effect transistors having silicon-nitride as a dielectric to experience a shift in threshold voltage, $V_t$, upon the application of a large negative potential across the dielectric film. However, the shift in threshold voltage does not occur if this negative potential is below a selected value. For the devices herein illustrated, a negative 10 volts applied across the dielectric film does not produce a significant shift in the threshold value; whereas a negative potential in the order of a negative 30 volts will effect the shift in the threshold voltage as illustrated by the separation between the curves 126 and 128 of FIG. 3. It is important to note that after termination of the write pulse, the information representing the state of the switch circuit 20 (i.e., open or closed) is permanently stored by the transistor 22 and this storage is independent of subsequent activities of the circuit such as the removal of prime power.

The silicon photo-diode 32 may be easily deposited as part of an integrated circuit with its junction area being of sufficient size to produce the desired photo-effects (heavy conduction in the presence of a fairly strong light beam).

Hence, during the setting or writing period (large negative potential applied to the gate 38) the transistor 22 is set to either the threshold level depicted by curves 128 or 126 of FIG. 3, respectively depending on whether the diode 32 was or was not illuminated by radiant energy at the time of application of the write pulse.

During the normal mode of operation (read mode) of the circuit arrays incorporating the photo-select switching circuit 20, a read voltage of an amplitude between the threshold values, $V_t$, of the transistor 22 is applied to the gate terminal 38. For example, referring to FIG. 3, the amplitude of the read pulse could be selected to be approximately a negative 8 volts so that if the transistor has a transfer characteristic set to correspond to the curve 126 it would conduct heavily while if the threshold level had been previously set to the characteristic depicted by the curve 128, then the transistor would be essentially non-conducting. Also, during the normal or read mode, a negative potential sufficient to cause metal-oxide-silicon transistor 24 to conduct heavily, for example, a negative 15 volts, is applied to the gate terminal 43 of the transistor 24 from the read signal generator 44.

To summarize the operation of the photo-select switch circuit 20, if diode 32 is illuminated during the write or setting mode, the transfer characteristic of the diode 22 is non-volatilely set to correspond to the curve 128 of FIG. 3; and during the read or normal operation mode the transistor 22 does not conduct. Hence the voltage at the drain terminal 42 is substantially the same as the potential of DC source 30 thereby causing the metal-oxide-silicon gating transistor 26 to "turn on" (i.e., a low impedance between terminals 34 and 36 of the last-mentioned transistor.

On the other hand, if the diode 32 was not illuminated by a light source during the setting period, its threshold level would be as shown by the curve 126 on FIG. 3 and the read potential (for example, a negative 8 volts) would cause transistor 22 to conduct heavily. It will be recalled that during the read mode of operation that transistor 24 is also gated on and, therefore, the voltage applied to the gate terminal of the transistor 26 will be at approximately ground potential, causing a high impedance between terminals 34 and 36 — hence, the switch is in the "off" position.

In the following explanation of the microcircuits which may be configured in response to light beams, the symbology of FIG. 8 has been adopted to represent the photo-select logic circuit 20. FIG. 8*a* depicts the switching circuit 20 set by the above-described procedure to the open or high impedance state between terminal 34 and 36. FIG. 8b shows the mechanical analog of the circuit of FIG. 8*a* with the switch 20a simulating the circuit 20. Similarly, FIG. 8*c* depicts the circuit 20 in the "closed" or low impedance configuration and FIG. 8*d* shows the mechanical analog thereof. The control lead connecting the switch 20 to the source of read, write and erase signals such as the generators 40 and 44 of FIG. 1; and the leads connecting the circuit 20 to the potential source such as the source 30 have not been incorporated into the symbology of FIG. 8 in the interests of simplicity and clarity. It will be understood, however, that such connections exist in accordance with the foregoing teachings.

FIG. 9a shows how the photo-switching circuit 20 may be incorporated into a resistor scaling network 46 comprising resistor elements 48. By selectively energizing certain of the switch circuits 20 and not others of these switches, with a light beam during the setting or write period, the resistor network 46 may be set to any one of a large number of scale factor values.

Similarly, FIG. 9*b* shows how the photoswitching circuits such as circuit 20, may be incorporated into a capacitor scaling network 50 comprising capacitor elements 52. Once again, by selectively energizing certain of the photo switch circuits 20, and not others of these circuits, the network 50 may be set to any one of a large variety of scale factor values.

It will be appreciated that the circuits of FIGS. 9*a* and 9*c* may be incorporated into large scale integrated circuit arrays as input and output circuits of active integrated circuits, allowing such active circuits a large range of functional configurations. For example, the basic differential amplifiers 60 of FIG. 10 may be utilized for the functionally different configurations shown in FIGS. 10*a*, 10*b*, 10*c* and 10*d*.

Referring now primarily to FIG. 10, the circuit 60 may be a gated, dual-channel differential inputs and outputs video amplifier integrated circuit such as a MC1545, manufactured by Motorola Semiconductor Products, Inc. of Phoenix, Arizona. This amplifier has four input terminals — 62 through 65, two output terminals — 66 and 68, and a gate or gain control terminal 70. Input network 72 is operatively associated with input terminal 62, input network 74, with input terminal 63, and input network 76 with input terminal 64. Output networks 78 and 80 are associated with output terminals 66 and 68, respectively; and gate input network 82 with gate input terminals 70.

Figure 10A:
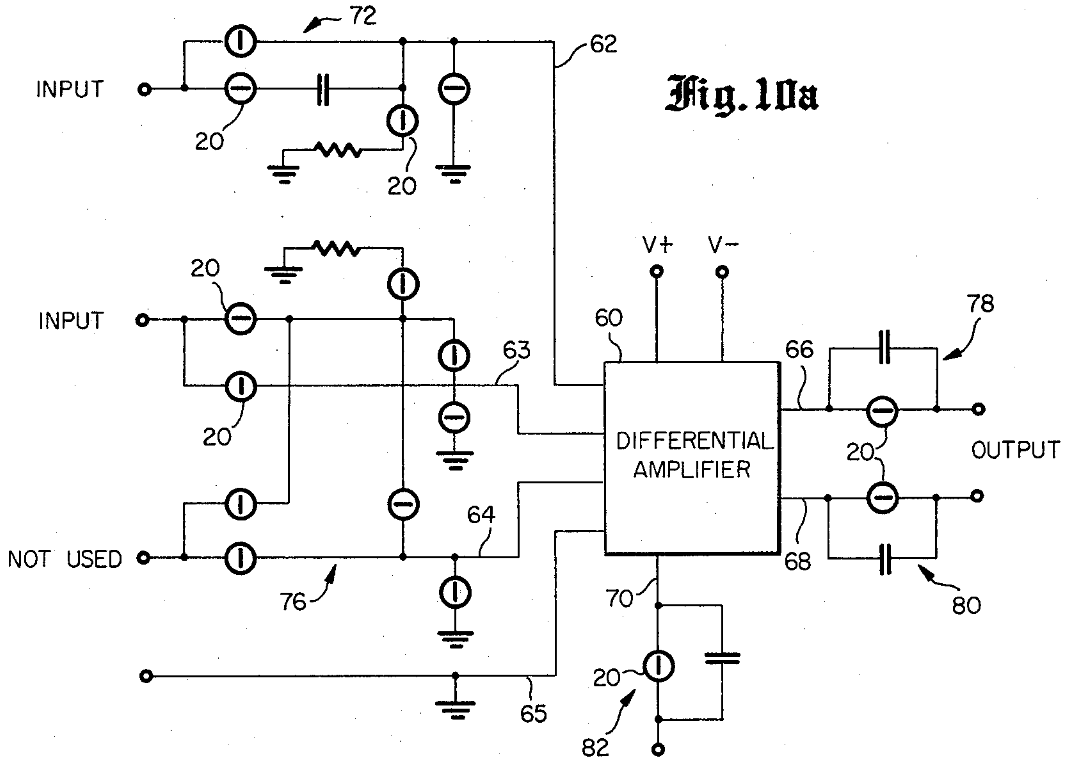
FIGS. 10*a*, 10*b*, 10*c* and 10*d* illustrate how a basic circuit may be manufactured with fixed input and output elements and may then be changed to any selected one of a variety of different functional devices by modifications of input and output networks by the proper selection of switching conditions of photo-select switching devices.
Figure 10B:
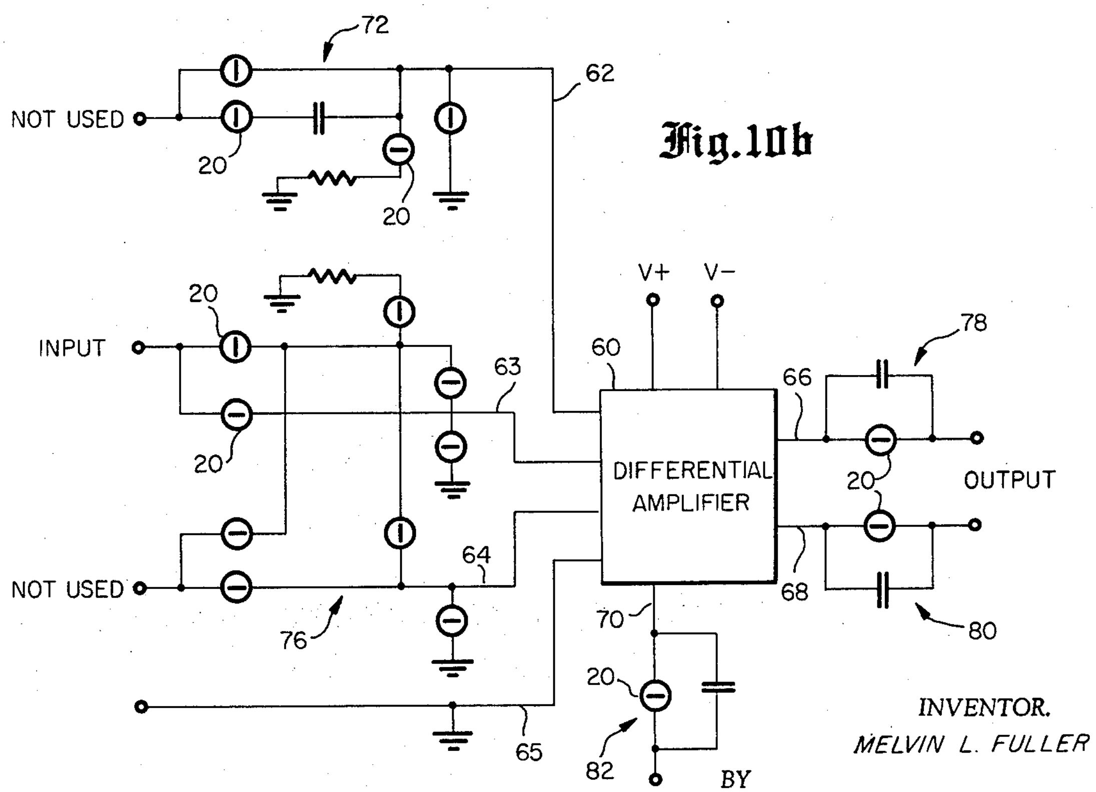
Figure 10C:
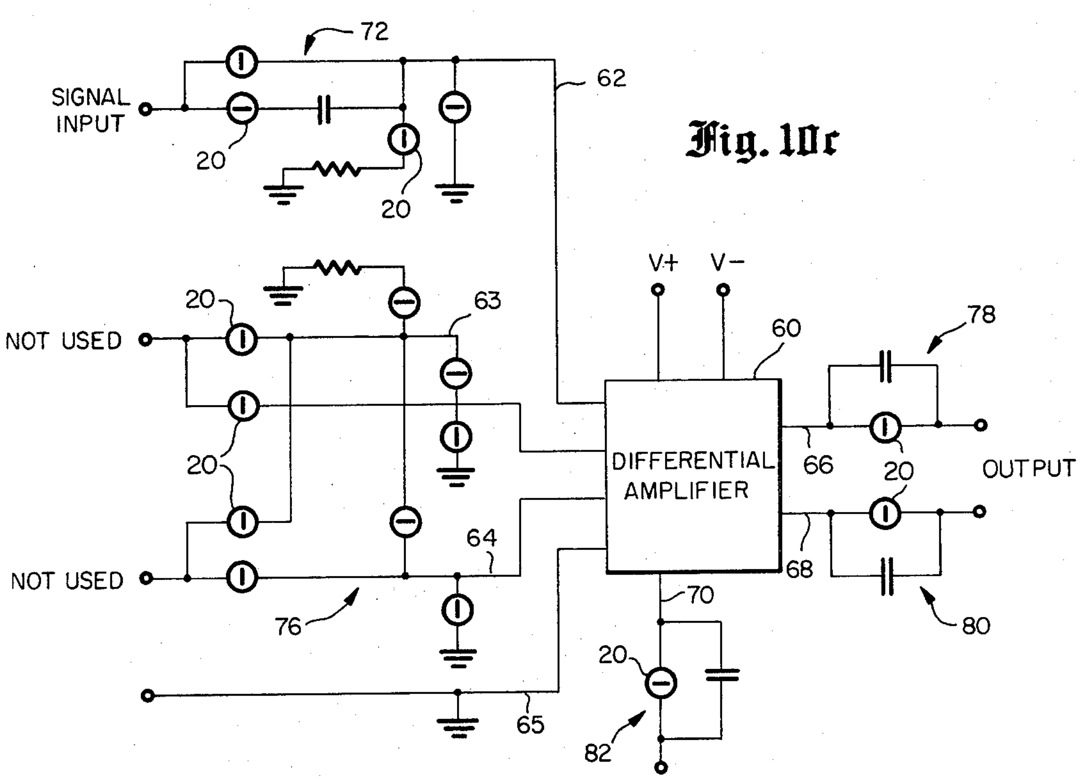
Figure 10D:
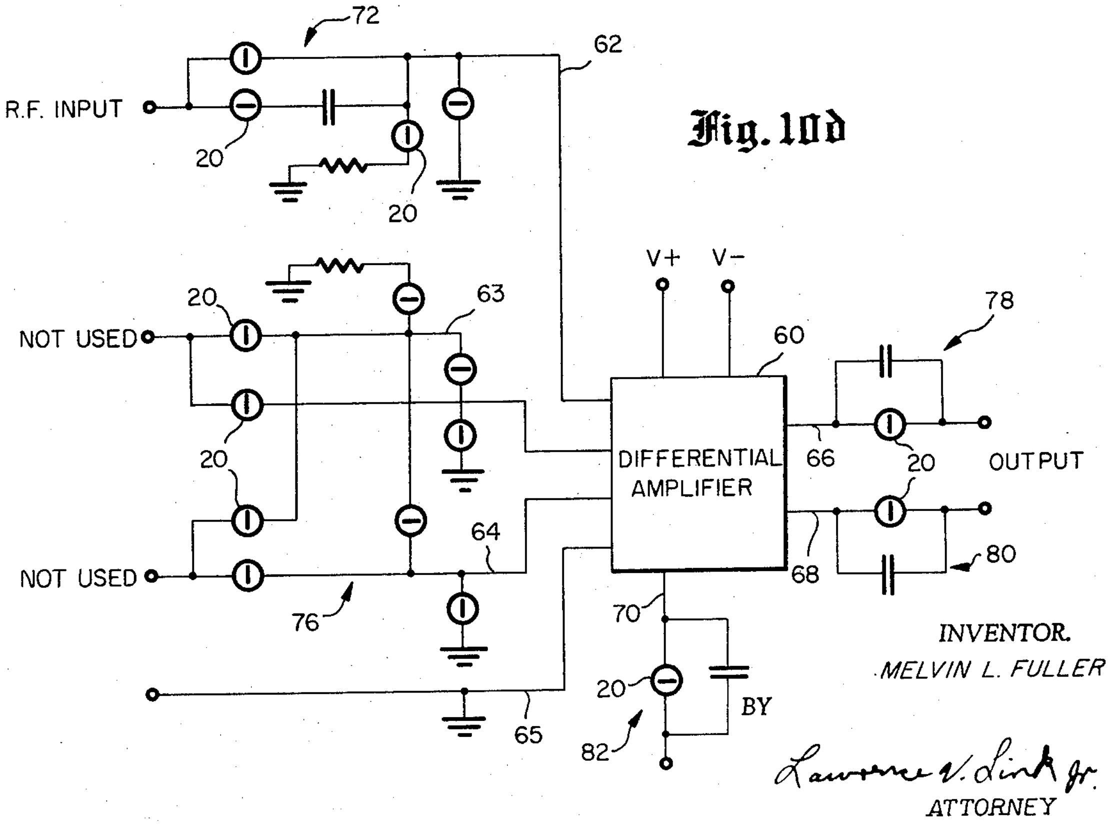

It should be noted that all of the circuits of FIGS. 10*a*, 10*b*, 10*c*, and 10*d* are structurally identical, including the input, output and gate networks. However, by proper selection of the settings of the photo-switches 20, the circuit of FIG. 10*a* is configured to function as a pulse width modulator, the circuit of FIG. 10*b* as a balanced modulator; the circuit of 10*c* as an analog switch and the circuit of FIG. 10*d* as an amplitude modulator. It will now be apparent that the just-described circuits of FIG. 10 which may be manufactured in a single integrated structural configuration and then set to a desired one of a plurality of different configurations in response to a light beam. This will not only save manufacturing costs by standardization of the different types, but will also greatly reduce the inventory levels which distributors must maintain.

Figure 11:
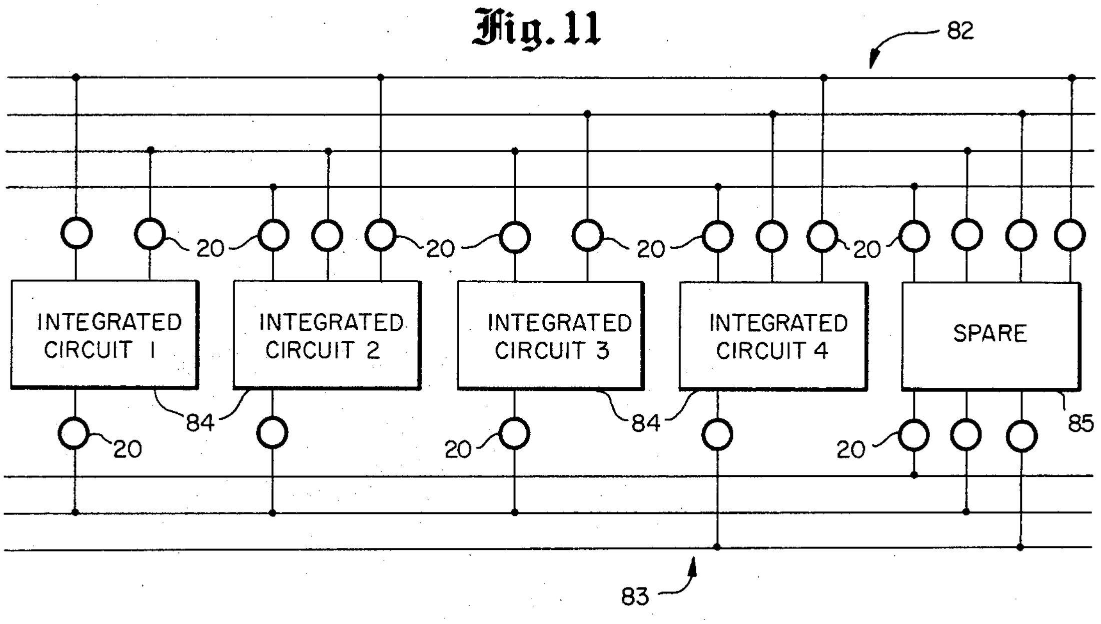
FIG. 11 is an array comprising a plurality of identical operational circuits and a spare circuit of the same type, interconnected to input and output lines by photo-select switches so that a faulty operational unit may be replaced by the spare unit.

FIG. 11 shows in schematic and blocked diagram form a portion of an integrated circuit array having an input lead network 82 and an output network 83 coupled to a plurality of identical integrated circuits 84 and a spare circuit 85, the last-mentioned spare circuit 85 being of the same type as the circuits 84. Each connection between the input and output networks and the circuits 84 and 85 are coupled through separate photo-select switches designated by the referenced numeral 20. If upon testing of these circuits 84 after manufacture they are all found to be functional, then the switches 20 associated with all the units are illuminated during the setting period and these units are thereby coupled to the array. However, if one of the circuits 84 is defective, or if it subsequently should fail during use, then the switches 20 associated with that circuit are set to the open state and the switches associated with the spare unit 85 are set to the closed configuration so that the unit 85 may replace the faulty circuit.

Figures 12, 13:
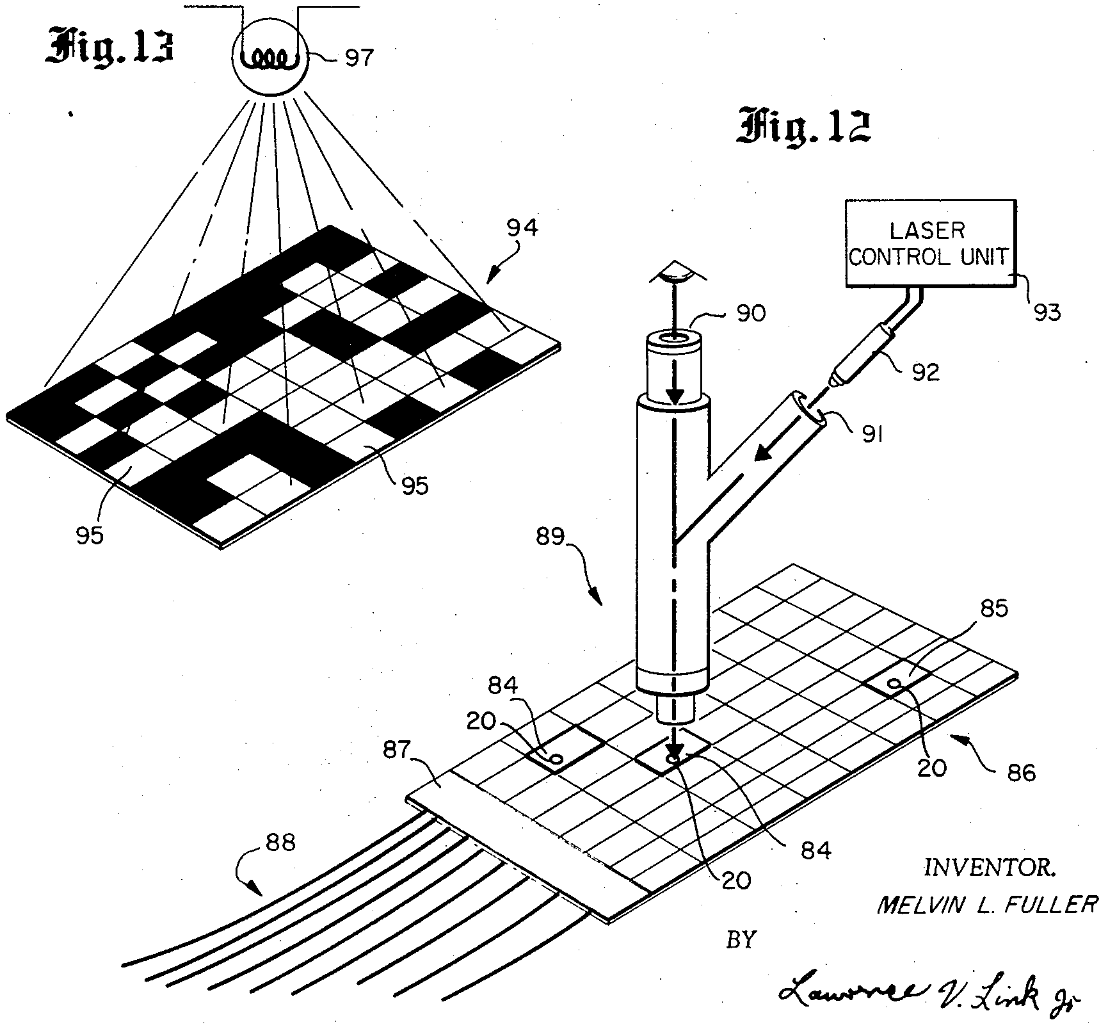
FIG. 12 illustrates the method of actuating the photo-select switches by means of a laser device focused through a dual port viewer-illuminator onto a large-scale integrated circuit array.
FIG. 13 depicts a mask having transparent areas alignable with those photo-select switching devices to be illuminated by a source of radiant energy, and the connections of the array are switched to a functional configuration determined by the transparency pattern of the mask.

FIG. 12 shows a large scale integrated array 86 which comprises a plurality of integrated microcircuits such as circuits 84 and a spare unit 85. A connector 87 provides output connections 88 to a test console (not shown). The test console makes the required connections to determine whether the circuits of the array are functional and also provides the erase, write and operate voltages described hereinabove relative to FIG. 1. The viewer-illuminator device 89 has a view-port 90 used to locate the photo diode associated with a particular photo-switch 20, and an illumination port 91 for activating the selected diodes. In the apparatus of FIG. 12, a laser device 92 is controlled by a control unit 93 which pulses the laser to provide the light energy for setting photo-select switches 20. The position of the viewer-illuminator 89, as well as the control (firing) of the laser 92 could be manually performed. However, if preferred in large scale operations, the array 86 could be accurately positioned with respect to a reference position of the viewer-illuminator 89 and the viewer-illuminator could be automatically positioned to a given coordinate location corresponding to a particular photo-diode associated with a particular photo-select switch unit 20.

Alternately, as shown in FIG. 13, a mask 94 having transparent areas 95 adapted to be alignable with selected photo-select switches 20 in the array 86 to be set to the closed position, may be positioned between the array and a source of radiant energy 97. In accordance with this just-described scheme an entire array may be set in one operation. This technique can be used for arrays where the component circuits are known to be operational but the functional configuration is selected for one of a possible large variety of applications.

Thus, there has been described microcircuits and arrays thereof adapted to be functionally configured in response to radiant energy applied thereto. This will permit utilization of circuits containing faulty devices by allowing the configuring or reconfiguring of the arrays logic in such a manner as to isolate and bypass the faulty devices. The principles disclosed herein allows repair of large scale integrated arrays by making possible the replacement of a failed device with a built-in spare. Further, complex circuits may be manufactured as large scale integrated devices with increased yield due to the fact that the defective circuits may be bypassed by the photo-select devices and replaced by spare units. Further, complex circuits may be manufactured and inventoried in one configuration having inputs and output networks which may be functionally reconfigured in response to a light beam. Hence a single standardized circuit is adaptable to a large variety of functional applications. To offer even greater variety in such circuits, the scale factor of the input and output circuits may be readily changed to fit a particular application by optically setting input and output resistor-capacitor networks.

It is noted that in the embodiments described herein that the memory element of switch 20 (transistor 22) has been described in terms of metal-nitride-silicon insulated gate field-effect transistors. However, it will be understood that any suitable memory type device which exhibits the characteristics shown in FIG. 3 may be utilized in accordance with the principles of the subject invention. Also, it will be understood that, although some of the embodiments described herein have, for the sake of simplicity and clarity been shown in block and schematic form, that the principles of the subject invention are readily adaptable to microcircuits such as utilized in large-scale integrated arrays formed on a single substrate or chip. In particular, it is noted that the metal-oxide-silicon and the metal-nitride-silicon field-effect transistor device may be formed as shown in FIG. 2 and that resistors and capacitors may be deposited in integrated form. For example, resistors may be constructed from metal-oxide-silicon transistors with the gate electrode connected to the drain electrode; capacitors may be obtained from the capacity of P-N junctions, and the photo-diode may be deposited as a conventional integrated circuit diode with an enlarged junction area. Still further, the transistors discussed herein have been illustrated as devices comprising P channels on N substrates. However, it will be apparent to those skilled in the art that N channels on P substrate devices could be utilized in accordance with the principles of the subject invention with the proper reversal of the plurality of supply voltages and input signals.

What is claimed is:

1. An enable circuit for controlling operation of an output circuit, said enable circuit comprising: non-volatile memory means comprising first and second insulated-gate field-effect transistors, the source electrode of said first transistor being connected to the drain electrode of said second transistor; drive means connected to the control electrodes of said first and second transistors for selectively supplying read and write signals to said memory means; radiation-responsive diode means connected between the drain electrode of said first transistor and the source electrode of said second transistor so that the conductive characteristics of said first and second transistors are established in accordance with incident radiation impinging said diode means when said drive means supplies a write signal to said memory means; electronic switch means having control means connected to said memory means and to one side of said diode means; and output means connected to said switch means adapted to be connected to said output circuit, said memory means conditioning said switch means to control operation of said output circuit in accordance with the conductive characteristics of said first and second transistors when said drive means supplies a read signal to said memory means, whereby the conductive characteristics of said memory means are non-volatilely determined by the characteristics of radiation impinging said diode means when a write signal is supplied to said memory means.

2. Apparatus according to claim 1 wherein said radiation-responsive diode means comprises a light-responsive diode.

3. Apparatus according to claim 2 wherein said drive means comprises first generator means connected to the control electrode of said first transistor for supplying said write signals to said first transistor, and second generator means connected to the control electrode of said second transistor for supplying said read signals to said second transistor.

4. Apparatus according to claim 3 wherein said electronic switch means comprises a third insulated-gate field-effect transistor having its control electrode connected to one side of said diode.

5. Apparatus according to claim 2 wherein said electronic switch means comprises a third insulated-gate field-effect transistor having its control electrode connected to one side of said diode.

* * * * *